July 7, 1931.  E. W. DAVIS  1,812,864
LIQUID HANDLING MEANS
Filed Dec. 9, 1925
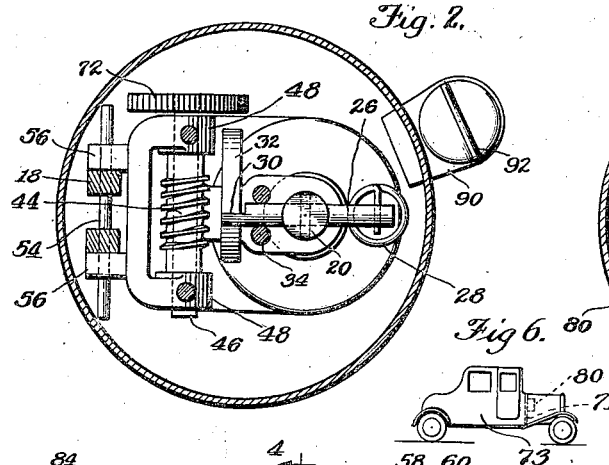
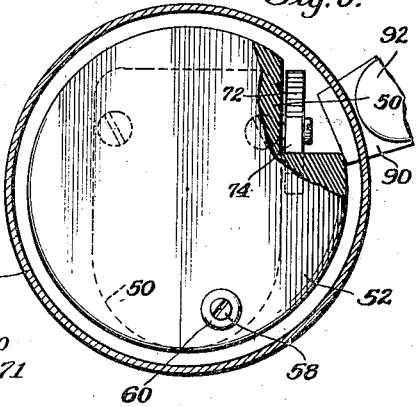
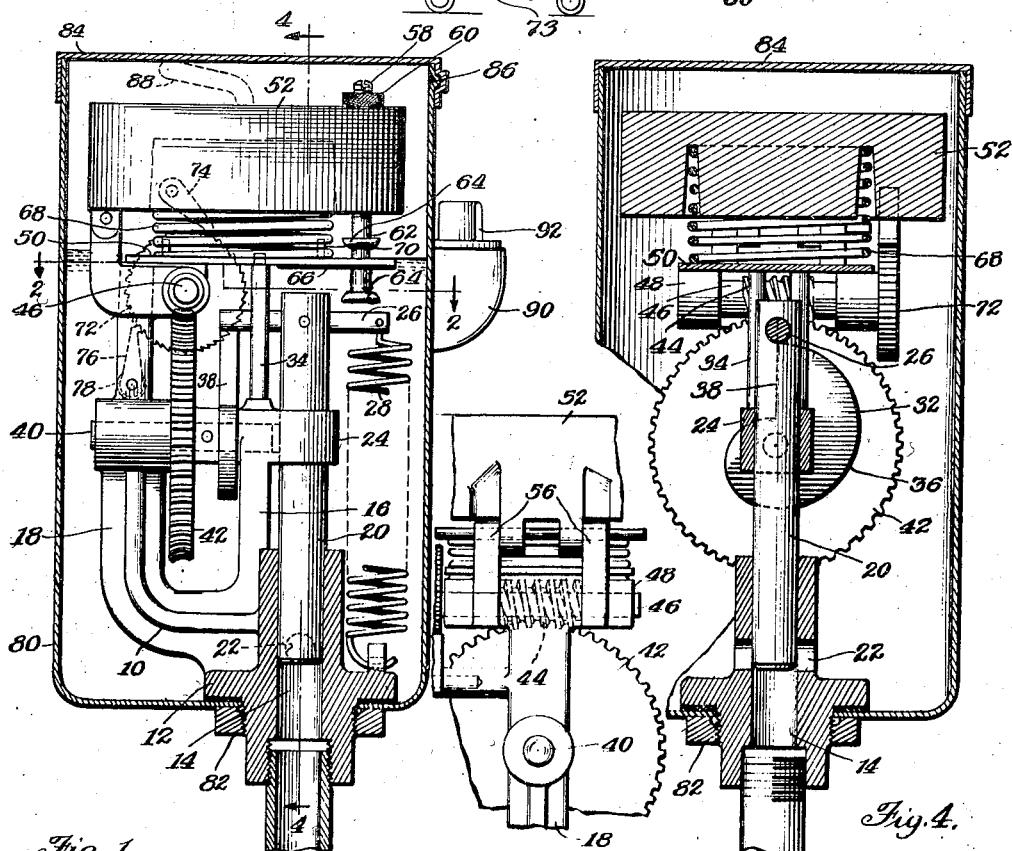
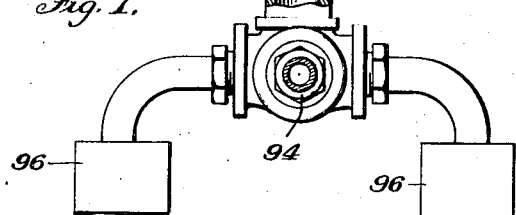
Inventor
Ernest W. Davis
By Pierce and Sweet
Attys.

Patented July 7, 1931

1,812,864

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LIQUID HANDLING MEANS

Application filed December 9, 1925. Serial No. 74,421.

My invention relates to means for handling liquids such as lubricant and other materials.

Among the objects and advantages of the invention may be enumerated:

First, to simplify the construction of power-generating means for material dispensing systems;

Second, to provide a pump and a vibration actuated power plant therefor, constituting a unitary structure independent of any oil receptacle that may be employed in connection therewith;

Third, to prevent automatically the filling of a container to such an extent as to interfere with the operation of an inertia operated power plant housed therein; and Fourth, to increase the efficiency of inertia operated power plants, especially when actuated by the vibrations of a motor vehicle body when passing over a road surface.

Devices according to the invention are useful for handling any material of a substantially liquid character, such as soap, mucilage, gasoline, or lubricating oil.

Further objects and advantages of the invention will become apparent as the description proceeds.

In the accompanying drawings:

Figure 1 is a vertical view, partly in section, of material handling means according to the invention;

Figure 2 is a section on line 2—2 of Figure 1;

Figure 3 is a top plan view of the same parts with the cover removed;

Figure 4 is a section in a plane at right angles to that of Figure 1;

Figure 5 is a detail, side elevation of part of the power plant and transmission; and Figure 6 is a diagram showing one suitable location for the pump on a motor vehicle chassis.

In the embodiment of the invention selected for illustration I have shown a unitary frame 10 comprising a base portion 12 in which the cylinder 14 is formed, an upright 16, close to the cylinder, and an off-set upright 18. A plunger 20 is adapted to reciprocate in the cylinder 14, moving up just far enough to clear the inlet ports 22, and guided in its motion by a guide 24 carried by the upright 16. At its upper end the plunger carries a cross arm 26, one end of which is resiliently urged downwardly by a suitable coil spring 28 and the other end of which is notched at 30 where it overlies the cam 32. Rotation of the plunger 20 about its own axis is prevented by a bifurcated extension 34 straddling the arm 26. This extension also forms part of the structural frame supporting the power plant, as will appear hereinafter. The cam 32 has a gradual rise 36, occupying substantially 360° of its periphery and terminating in a radial face 38 which will permit the cross arm 26 to drop abruptly under the action of the spring 28 once during each revolution of the cam. The cam is mounted on a shaft 40 journaled in the uprights 16 and 18 and the shaft also carries a relatively large worm wheel 42 meshing with a worm 44 on an upper shaft 46 lying in a vertical plane at right angles to that of the lower shaft 40. Spaced lugs 48 on the upright 18 provide journals for the upper shaft.

The upright 18 and the extension 34 co-operate in supporting a plate 50 forming part of the supporting means for the power plant and also functioning as a baffle tending to prevent surges in the material from interfering with the operation of the power plant. The power plant comprises a cylindrical weight 52, pivoted on a pintle 54 supported in lugs 56 on the upright 18. Opposite its pivot the weight is provided with an adjustable shaft 58 held in adjusted position by a lock nut 60 with collars 64 at opposite ends thereof. A leaf spring 66, projecting from the plate 50, is bifurcated at its outer end to straddle the portion 62 and engage the collars to limit the oscillations of the weight 52.

A supporting spring 68, of relatively large diameter, is housed in a suitable socket in the lower face of the weight 52 and bears on the plate 50, being held in alignment by suitable lugs 70, or the like.

The parts are preferably so adjusted that the equilibrium position of the weight is nearer the lower limit of its movement than the upper limit. I have found that such an adjustment will materially increase the amount of energy that can be taken out of the power plant when actuated by the vibrations occurring in the body of a motor vehicle driven over an ordinary road surface. In Figure 6 I have indicated a position for the pump on the dash 71 of the motor vehicle 73.

I have provided a suitable transmission between the weight 52 and the transverse shaft 46, comprising a ratchet wheel 72 on one end of the shaft and a pawl 74 on the bottom of the weight 52. The pawl 74 rides over the teeth under the action of gravity alone. I have indicated a holding pawl 76 held in engagement with the teeth by a coil spring 78. If desired, this holding pawl may be omitted and the worm drive relied on to hold the ratchet wheel 72 against reverse movement during upward displacement of the weight 52.

The means I have illustrated for supplying material to the pump comprise a container 80 apertured to receive the cylinder 14 through its bottom and engage the base 12, being firmly clamped in place by a suitable lock nut 82. At its upper end the container is provided with a suitable cover 84 held in place by bosses 86 entering bayonet slot grooves 88 stamped in the flange of the cover.

The container is provided with a filling inlet 90 opening upwardly at 92 and thereby limiting the level to which the container 80 can be filled. As shown, the maximum level possible is only slightly above the plate 50; so that the weight 52 will operate in air undamped by the material. The entire pump and transmission mechanism are submerged in the material and limit greatly the surging movement of the material due to vibration. This action is assisted by the plate 50.

When used as part of a lubricating system the particular embodiment of my invention herein disclosed is intended to operate in conjunction with a branched system of piping indicated by the four-way tee shown at 94 and a plurality of individual pressure operated measuring devices, one at each point to be lubricated, as indicated at 96. These measuring devices may be of any suitable or preferred character, such, for instance, as those illustrated in my copending application, Serial No. 47,527, filed August 7, 1925.

Without further elaboration, the foregoing will so fully explain the gist of my invention, that others may, by applying current knowledge, readily adapt the same for use under various conditions of service without eliminating certain features which may properly be said to constitute the essential items of novelty involved, which items are intended to be defined and secured to me by the following claims.

I claim:

1. Handling means for material of a substantially liquid nature, comprising a unitary support, an inertia operated power mechanism at the top of said support, a portion of said power mechanism requiring freedom of oscillation, a pump near the bottom of said support, a transmission between said power mechanism and said pump, a receptacle fastened on said support and enclosing said pump, transmission and power mechanism, and a filling inlet for said receptacle determining the maximum level of material in said receptacle, said level being below that of the portion of said power mechanism requiring freedom of oscillation but above said transmission and pump to submerge them.

2. Handling means for material of a substantially liquid nature, comprising a supporting frame, said frame comprising a cylinder and spaced uprights, one close to said cylinder and another off-set laterally, a plunger guide above said cylinder on said first upright, aligned journals in both uprights, a lower shaft in said journals, a cam on said shaft having a slow rise and an abrupt drop, a plunger in said cylinder and guide, a cross arm carried by said plunger above said guide, said cross arm overlying said cam to be lifted thereby, a spring pulling down on the other end of said cross arm, an upper shaft lying in a vertical plane at right angles to that of said lower shaft and journaled on said off-set upright, a worm drive between said shafts, a bifurcated extension on said first upright, said cross arm moving in said bifurcation, a baffle-plate supported by said extension and said off-set upright, a weight above said plate pivoted on said off-set upright, said weight being of large diameter and covering said uprights and the mechanism carried thereby, a spring also of large diameter between said weight and plate, adjustable means for limiting the excursions of said weight, said spring normally holding said weight nearer the lower than the upper limit, an overriding pawl and ratchet connection between said weight and said upper shaft, a receptacle housing all the parts heretofore recited, and filling means for said receptacle capable of filling it to a maximum level below said plate only.

3. Handling means for material of a substantially liquid nature, comprising a supporting frame, a cylinder in said frame, a shaft, a cam on said shaft having a slow rise and an abrupt drop, a plunger in said cylinder, a spring pulling down on said plunger, an operative connection between said cam and plunger for lifting the same, an inertia operated power mechanism above said shaft and supported by said frame, and a transmission from said power mechanism to said shaft.

4. Handling means for material of a substantially liquid nature, comprising a cylinder, a plunger in said cylinder, a lower shaft, a cam on said shaft having a slow rise and an abrupt drop, an operative connection between said plunger and said cam, an upper shaft, a drive between said shafts, a baffle-plate above said upper shaft, a weight movably mounted above said plate, an overriding drive connection between said weight and said upper shaft, and a receptacle housing all the parts heretofore recited.

5. Handling means for material of a substantially liquid nature, comprising a cylinder, a plunger in said cylinder, a lower shaft, a cam on said shaft having a slow rise and an abrupt drop, an operative connection between said plunger and said cam, an upper shaft, a drive between said shafts, a baffle-plate above said upper shaft, a weight movably mounted above said plate, and an overriding drive connection between said weight and said upper shaft.

6. Handling means for material of a substantially liquid nature, comprising pump means, a baffle-plate above said pump means, a weight movably mounted above said plate, said weight being of large diameter and covering said plate and the pump means below, a spring also of large diameter between said weight and plate, and an overriding drive connection between said weight and said pump means.

7. Handling means for material of a substantially liquid nature, comprising a resiliently supported weight and adjustable means for limiting the excursions of said weight, said weight normally lying nearer the lower than the upper limit of its movement, a resilient stop engaged by said means and pump means driven by oscillation of said weight.

8. Handling means for material of a substantially liquid nature, comprising a supporting frame, a cylinder, a shaft, a cam on said shaft having a slow rise and an abrupt drop, a plunger in said cylinder, a cross arm carried by said plunger, said cross arm overlying said cam to be lifted thereby, a spring pulling down on the other end of said cross arm, and means on said frame engaging said cross arm to guide it in up and down movement without rotation about the axis of said plunger.

9. In a pumping mechanism, the combination of a support, a weight resiliently poised with respect thereto, means for vibrating said support, power transmission means driven by said weight during movement with respect to said support in one direction only, and stop means limiting the excursions of said weight in both directions, the equilibrium position of said weight being nearer to the end of the power stroke than to the beginning of said stroke.

10. In a pumping mechanism, the combination of a support, a weight resiliently poised with respect thereto, means for vibrating said support, power transmission means driven by said weight during downward movement only with respect to said support, and stop means limiting the excursions of said weight in both directions, the equilibrium position of said weight being nearer to the end of the power stroke than to the beginning of said stroke.

11. In a motor vehicle, a support, a weight resiliently poised with respect thereto, means for mounting said support on the body of said vehicle to subject it to the vibration caused by driving the vehicle, means for taking power out of the movement of said weight on the down stroke only, and stop means limiting the excursions of said weight in both directions, the equilibrium position of said weight being nearer the lower limit than the upper limit of movement.

12. In a motor vehicle, a support, a weight resiliently poised with respect thereto, means for mounting said support on a portion of said vehicle to subject it to the vibration of said portion caused by driving the vehicle, means for taking power out of the movement of said weight, and stop means limiting the excursions of said weight in both directions, the equilibrium position of said weight being nearer the lower limit than the upper limit of movement.

In witness whereof, I hereunto subscribe my name this 25th day of November, 1925.

ERNEST W. DAVIS.